Figure 1:
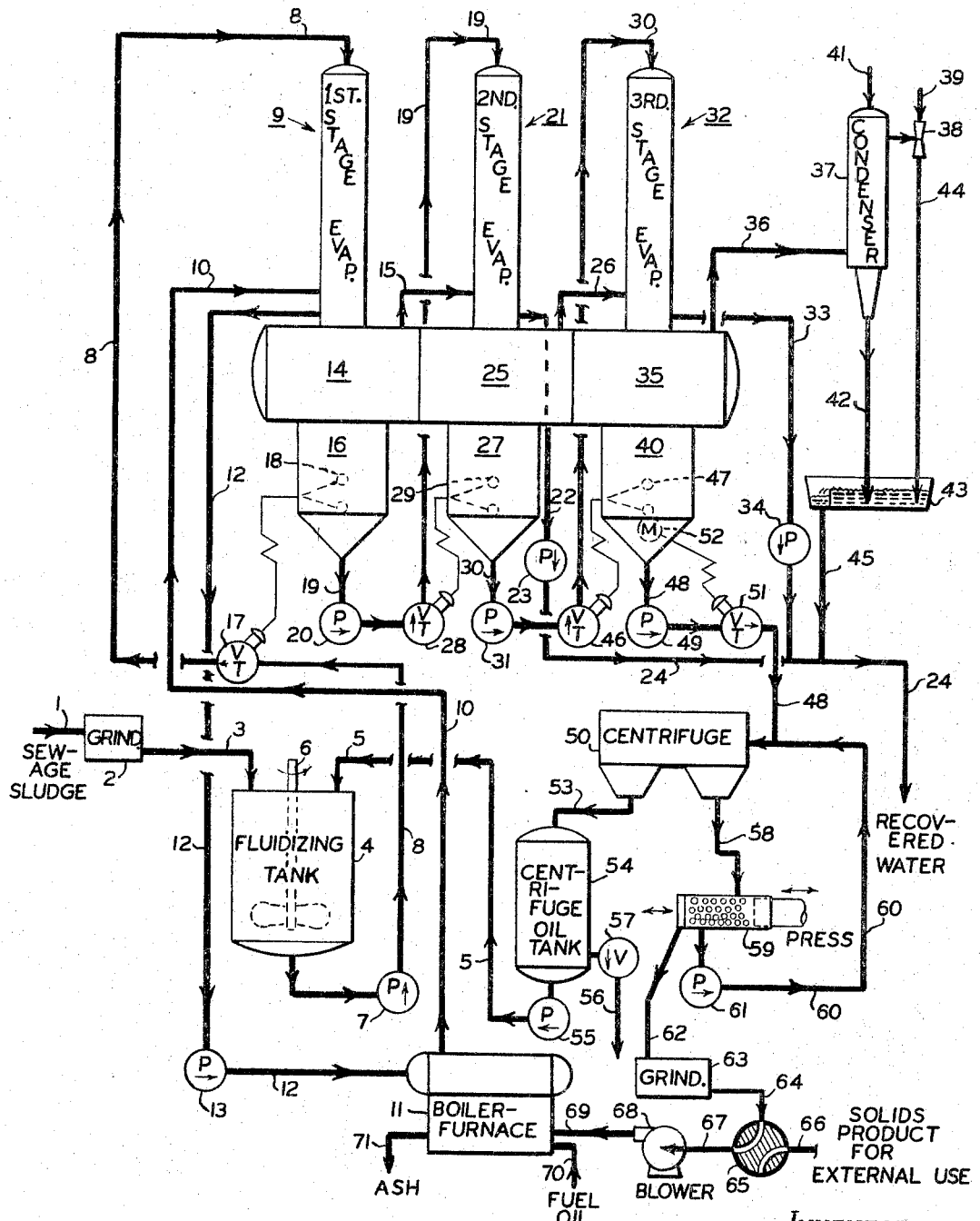

June 6, 1967 C. GREENFIELD 3,323,575
APPARATUS AND PROCESS FOR DEHYDRATING
WASTE SOLIDS CONCENTRATES
Filed April 5, 1966 2 Sheets-Sheet 1

INVENTOR.
CHARLES GREENFIELD
BY
Richard L. Cannaday
ATTORNEY

United States Patent Office 3,323,575
Patented June 6, 1967

3,323,575
APPARATUS AND PROCESS FOR DEHYDRATING
WASTE SOLIDS CONCENTRATES
Charles Greenfield, 35 Walnut St.,
Murray Hill, N.J. 07971
Filed Apr. 5, 1966, Ser. No. 540,312
17 Claims. (Cl. 159—13)

The present application is a continuation-in-part of copending application Ser. No. 311,792 filed in the United States Patent Office on Sept. 26, 1963, now United States Patent No. 3,251,398, issued May 17, 1966, and co-pending application Ser. No. 528,258 filed in the United States Patent Office on Feb. 17, 1966, now United States Patent No. 3,304,991, issued Feb. 21, 1967.

This invention relates to an improved apparatus and process for dehydrating waste solids concentrates, particularly sewage sludge. More particularly it relates to an apparatus and process wherein and whereby an oil-admixed waste solids concentrate is subjected to a plurality of sequential heat evaporation steps at successively lower temperatures and successively higher concentrations for the removal of its water content essentially completely. Still more particularly the invention relates to an apparatus and process of the kind described in and by which after the steps of evaporative dehydration the waste solids concentrate is subjected to mechanical action for the removal of a substantial amount of the admixed oil therefrom. It relates even still more particularly to an apparatus and process of this kind in and by which the free oil generated in the deoiling step is recirculated for mixing with incoming waste solids concentrate to keep the concentrate, or solids content thereof, fluid and pumpable after removal of its water content, and the waste solids generated in the deoiling step are burnable as fuel to generate steam for the evaporative steps. Further, the invention relates yet even still more particularly to such an apparatus and process which are self-sustaining with respect to the generation of oil, for example, sewage oil, for fluidity and pumpability maintenance and waste solids for boiler fuel for evaporator and power steam generation. In some cases, to be sure, it may be more attractive economically to sell these solids for fertilizer than to burn them as fuel.

The economic disposal of waste solids concentrates is a recognized problem. Ideally, waste solid concentrate disposal apparatuses and processes should provide ease of disposition, avoidance of pollution, economic operation, and hygienic handling. This is particularly true when the concentrate is sewage sludge. Furthermore, it is desirable to be able to obtain products which are either valuable in themselves or can be utilized to further the economics of the process.

In the customary processing known to the prior art, raw sewage is first treated by settling, aeration, and chemicals to generate a stream of water sufficiently clean to be discharged to a region of ultimate disposal such as a natural stream or a river, and a stream of quite watery sewage sludge which is discharged to a closed tank called a digester. The digester is of sufficient volume that sewage sludge which it receives may have a dwell-time in it of thirty days or longer. Heating means such as hot water coils are provided in the digester, and the sludge is maintained at an elevated temperature to provide anaerobic bacterial digestion of the organic constituents which break down the solids in part into gaseous material. The gaseous material may have a substantial content of methane and thus be drawn off continuously to be burned as a fuel for heating the water circulated through the digester coils. Sewage solids in a stream which may have a water content of about ninety-five percent are drawn off from the digester and spread out in large drying beds for final evaporative drying. The resulting dry solids may be incinerated or disposed of to farms for fertilizer and other possible uses.

The apparatus and process of this invention comprise a systematic arrangement of equipment and a series of steps for treating waste solids concentrates, and particularly for treating sewage sludge as this sludge is in condition to be received in a digester according to prior art techniques. Thus the process and apparatus of the present invention do not replace the aforementioned settling, aeration, and chemical treatment steps applied to raw sewage, nor the apparatus for carrying them out, but do replace all traditional subsequent apparatus for and steps of sludge and solids treatment in a digester and drying beds, and in replacing this apparatus and these steps accomplish all of their purposes.

The present invention provides an improved apparatus and process for accomplishing these purposes in at least that the equipment needed to achieve them is far more compact and appreciably less expensive than the digestion equipment and drying bed area and installations, particularly where drying beds are enclosed by greenhouse-like structures for odor control and year-round utilization, and in at least further that the process steps are capable by themselves of effecting an essentially complete disposal of all of the constituents or components of sewage sludge, both solid and liquid, if disposal to this extent be desired.

The waste solids concentrate dehydration process of this invention as applied to the treatment of sewage sludge comprises the steps of admixing sewage sludge with an oil to obtain a mixture which will remain fluid and pumpable even after the removal of essentially its entire water content; subjecting the resulting mixture of sewage solids, water, and oil to a plurality of sequential dehydration steps by heat evaporation wherein each of the successive dehydration steps is at a successively lower temperature and the resulting oil-containing mixtures are of successively higher concentration because of increasing dehydration, the evolved vapors from each heat evaporation step except the last one supplying a substantial portion of the heat requirements of the following heat evaporation step, and withdrawing a resultant substantially anhydrous slurry of sewage sludge, or sewage solids, and oil. Thereafter, mechanical pressure of either a static or dynamic variety or both is exerted upon this anhydrous slurry to express the substantially greater part of its oil content to leave the sewage solids in a largely dry and oil-free or fat-free condition. Initially the solids particle size should not be in excess of ¼ inch, and a grinding step may be necessary for particle size reduction to make sure that the later formed mixture or slurry of sewage sludge and oil will flow through pipelines and pipe fittings without impediment.

Sewage sludge itself usually contains an appreciable amount of oil independently of oil which may be added to it in the aforementioned mixing step. This oil will be carried through the dehydration steps along with the sewage solids and the added oil, and be subjected to being pressed out of the dehydrated slurry along with the added oil. If the dry or substantially water-free slurry is pressed sufficiently vigorously it can thus be made to yield oil in a quantity or at a rate equal to or in excess of that in or at which oil was previously added to the sewage sludge in the mixing step. Generally it is desirable that the pressing step yield enough oil for the mixing step so that the process will be self-sufficient in respect of oil requirements. More desirably in most cases the pressing step will provide somewhat more oil than is needed for the mixing or pumpability maintenance step so that the process will provide a net oil yield or product.

The dry sewage solids left after the pressing operation can be utilized as fertilizer or possibly as animal feed or for other purposes outside the process itself, and thus constitute a process product. Further, being burnable, they can be used as fuel for the generation of steam needed to run the evaporator component of the apparatus for the dehydration steps, and also the steam needed to run auxiliary equipment such as pumps, either directly if they be steam-driven pumps or indirectly if they be motor-driven pumps and the steam is used to run a turbo-generator directly. The process can thus be self-sufficient in respect of fuel requirements. With sewage oil being cycled back for the mixing step; sewage solids being burned for process fuel, and water evaporated from the sewage sludge being discharged after condensation at sufficient purity to enter a natural stream or river, the apparatus and process of this invention thus provide useful, compact, and complete disposal of all of the components of sewage sludge except to the extent that some net quantities of commercially useful products such as dry sewage solids and sewage or sewage-like oil may be generated, and further that there may be some disposable ash left after the burning of pressed sewage solids for steam generation purposes.

On the basis of analyses of sewage sludge within the normal experience of the prior art, the material or concentrate to be treated by the method of the present invention may be expected to comprise non-fat solids in an amount of about 2 to 40 or more weight percent, usually 3 to 30 weight percent; fat or oil content in an amount of about 0.3 to 15 weight percent or higher; with the remainder being predominantly water. The solids particle size should be a maximum of about ¼ inch as aforesaid, which encompasses the normal distribution of sewage sludge. Larger particles such as from garbage can be ground to size or comminuted by existing techniques, making the process of this invention applicable to garbage under the general term "sewage." Under this same term, the inventive apparatus and process may be used also for the treatment of plant wastes.

The oils which are utilized for admixture with the sewage sludge are inert, relatively non-volatile oils or fats, or other oil-like materials. Typical of these are tallow, other animal fats, and vegetable oils all of which often can be derived directly from the process operation; fatty acids; petroleum oils and their fractions and derivatives including fuel oils; glycerines, glycols, and mixtures thereof, and miscellaneous liquid wastes from industrial plants, generally wastes of an organic nature. It is desirable to employ an oil that imparts process credits, i.e., one that can add value to the sewage product, such as waste oils normally found in sewage or industrial waste, or fuel oils, or, as suggested above, utilize oils derived in the practice of the process itself so as to minimize cost factors. The quantity of oil is such that its ratio in the system is in the range of about 2 to 20 parts by weight, based on the non-fat solids. This refers to total oil, i.e., that added plus that derived from the process for reuse. This amount of oil gives a fluid pumpable mixture even in the absence of sewage water, indeed a mixture of even improved fluidity and pumpability. The term "fluid" as used here is intended to be synonymous with "liquid," i.e., taking the shape of the container to the extent that the mixture fills its container. This will thus also include heavy, viscous fluids which are pumpable but still suitable for heat transfer purposes.

Equipment that can be employed for carrying out the dehydration steps of the process of this invention includes multiple-effect evaporators known in the art, e.g., Mojonnier, Bufflovak, Rodney-Hunt, etc. Functionally the evaporator equipment may be of the forced circulation, flash, falling film, single pass, rotary wiped film, or indeed any suitable type. The temperatures, pressures, and to some extent the concentrations obtaining and achieved in the dehydration steps are largely empiric in nature, depending upon the systems and oil being treated. Normal processing temperatures of an oil and waste solids concentrates mixture may indeed fall anywhere in the range about 100° F. to 400° F. with steam supplied to the evaporator at appropriately higher temperatures. Precise dehydration temperatures for any particular wet slurry or mixture will be functions of the desired quality of the end product and economics of fuel utilization, cooling water availability, capital investment, etc. Pressures are not critical and are controlled with temperatures to achieve desired evaporation rates in a given design.

By way of definition, with regard to evaporators in which fluid mixtures may be dehydrated in a plurality of sequential steps as well as those in which all dehydration takes place in a single step, the expression "first stage" refers to that part of the evaporator equipment in which the hydrated mixture or wet slurry is subjected to the first step of the aforesaid sequential plurality of dehydration steps, two or three or more corresponding to "first stage," "second stage," "third stage," etc. The expression "effect," on the other hand, as in "multiple effect," "first effect," "second effect," etc., is related to the flow and action of the heating steam in the evaporator equipment. Where the flow of the wet slurry being progressively heated and dried is countercurrent to that of the heating steam from stage to stage or effect to effect, the operation particularly illustrated and described in co-pending application Ser. No. 311,792 and respresenting a case of "backward flow," the first stage of a multi-effect or multiple effect evaporator is the same as its last effect. Conversely, where the flow of wet slurry is cocurrent with that of the heating steam from stage to stage or effect to effect, the operation particularly illustrated and described in connection with the present invention and representing a case of "forward flow," the first stage and first effect are the same as indeed they are in a single-stage or single-effect evaporator according to the disclosures of co-pending application Ser. No. 528,258. It is not especially meaningful to describe a single-stage or single-effect evaporator as operating in either backward flow or forward flow.

In forward flow operation of a two-stage or double-effect evaporator with feed material to be dehydrated entering at about 80° F., one pound of steam will effect the evaporation of about 1¼ to 1½ pounds of water in the absence of use of a thermal recompression cycle. Where such a cycle is used, as explained hereinafter, one pound of steam will effect the evaporation of about 2 to 2¼ pounds of water. Normally where sewage sludge is the material being treated according to the process of this invention, even in the absence of thermal recompression, it is expected that the aggregate heating value of the recovered sewage solids used as fuel will be sufficient to generate all of the steam required by the process carried out continuously. Also, this same process can be utilized for producing and handling solids products from other materials which are found in water solution or dispersion such as powdered coal, cement, spent lime, slimes, black liquor from the paper industry, etc., that is, materials which as found in that condition may reasonably be designated waste solids concentrates, and which further in that condition may be admixed with an oil to form a slurry.

The degree of initial solids concentration in the water solution or dispersion and the heating or calorific value of the solids will vary from case to case. It is reasonable to expect that in some cases the aggregate heating value of the recovered solids used as fuel will be considerably more than sufficient to generate all of the steam required for a continuous dehydrating operation, with the result that only some of the recovered solids need be burned to generate this steam with appreciable quantities of them still remaining available for sale as a net process product. Of course some concentrates amenable to treatment by the process of the present invention will not yield a solids product which has any significant heating or fuel value.

A water solution of cement would be an example of this. In such a case the process would be carried out essentially entirely to recover the solids for external use, together with purification of the water in which they were dispersed or dissolved.

In comparison with the single-effect evaporator process described in co-pending application Ser. 528,258, the process of the present invention, with or without thermal recompression, is always at an advantage with respect to fuel consumption whether or not in any given case the process is capable of generating more than sufficient, just sufficient, some but less than sufficient, or even no combustible material at all to be used as its own fuel. In comparison with the multi-effect, backward flow process described in co-pending application Ser. No. 311,792, the process of the present invention without thermal recompression may consume about 20% more fuel, and with thermal recompression it may consume 25% to 35% less fuel.

Slurry or a mixture of a waste solids concentrate and oil processed according to the persent invention achieves its highest processing temperature in the first or most dilute stage of the multi-stage or multi-effect evaporator. This is in contrast to the situation obtaining in a multistage evaporator operating in backward flow where the slurry temperature increases from stage to stage along with the degree of concentration of the waste solids. Thus in the backward flow arrangement the slurry achieves its highest temperature only in the last or most concentrated stage. The early achievement of peak temperature in a multi-effect evaporator used in forward flow compared to the late achievement of this peak in a backward flow device, where the mass of the slurry is decreasing as it flows through either device on account of water evaporation, means that the average level of slurry temperature at least referred to mass is higher for the multi-stage or multi-effect forward flow arrangement than it is for the multi-stage backward flow arrangement.

This higher average level of slurry temperature results in evaporator heat transfer coefficients being generally higher in the process of the present invention than they are in the process disclosed and claimed in co-pending application Ser. No. 311,792. Higher heat transfer coefficients tend to diminish the required area of heat transfer surface for a given evaporative load, and this in turn tends to diminish the size and cost of the evaporator required for the present process with respect to those of the one for the process of the co-pending application just mentioned.

The basic process of the present invention may be improved in respect of steam or fuel consumption by using a step of thermal recompression to increase the efficiency of the evaporator. In this improvement the vapor or steam used for heating in the second stage is divided. One part of it is condensed and sent to the condensate recovery system in the usual way. The remainder of it, quite possibly the greater part of the stream of hot vapor generated in the first stage and sent to the second stage for heating purposes, is drawn off still as a vapor into a venturi tube by aspirating action of the incoming steam to the whole evaporator system. Within the tube it mixes with and is raised somewhat in both temperature and pressure by the incoming steam. The mixed stream of steam and/or vapor leaving the venturi is relatively cool, being a good deal closer in temperature to the temperature of heating vapor withdrawn from the second stage than to that of the original steam supply. Indeed, the temperature of the mixed stream is desirably not many degrees above the evaporation temperature prevailing in the first stage.

The stream of steam and/or vapor discharged from the venturi which is here acting as a thermo-compressor, the aforesaid mixed stream, flows to the first stage evaporator and serves as the source of heat for this stage. In the first stage the slurry or mixture of waste solids concentrate and oil is in its most dilute form anywhere in the evaporator system, that is, there is the most water present for the given amount of solids. Thus, considered as an impurity with respect to the water content of the slurry, the solids will have the least effect to raise the boiling point of the water in the first stage as water is evaporated away because they are present there in the least concentration referred to the water. For this reason the first stage can operate to evaporate relatively large quantities of water from the slurry on the basis of a relatively small temperature difference between the stream of heating fluid from the thermo-compressor and the base evaporation temperature of the water content of the slurry flowing to the first stage. To provide high efficiency of heat transfer it is desirable that the transfer take place across a small temperature difference. In this respect, therefore, a multistage or multi-effect evaporator operating in forward flow and using a thermal recompression cycle is highly efficient.

Figure 2:
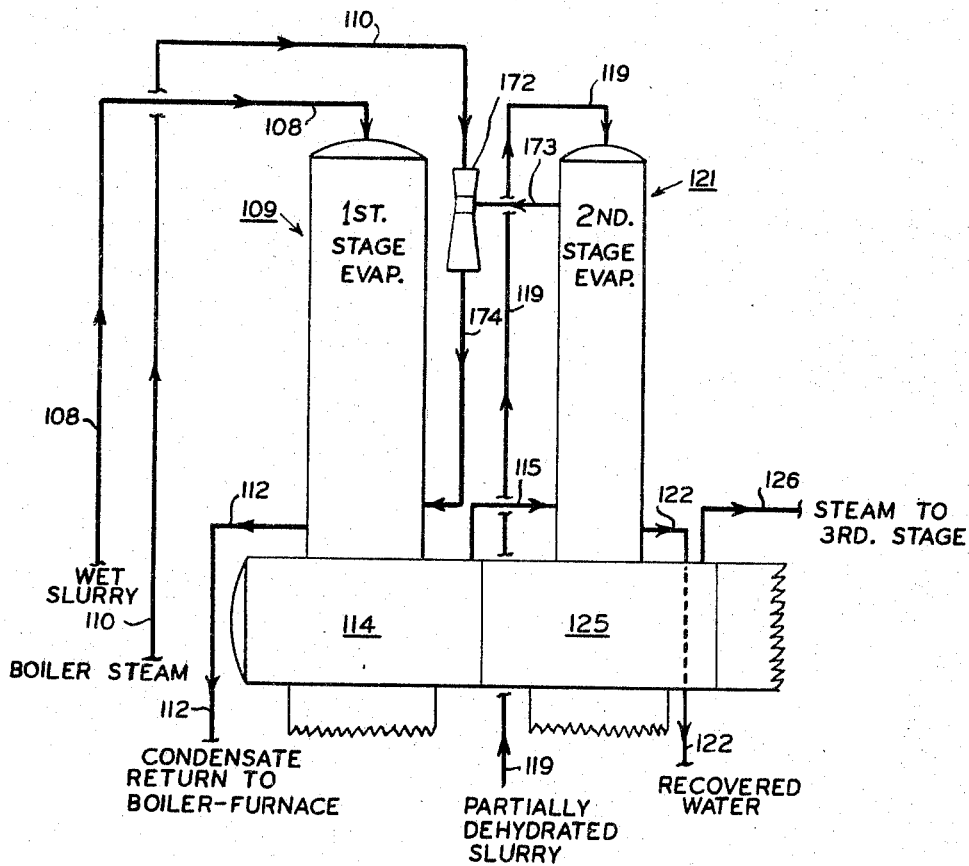

The nature and substance of this invention as well as its objects and advantages will be more clearly perceived and fully understood by referring to the following description and claims taken in connection with the accompanying drawings in which:

FIG. 1 represents a complete flow diagram of the apparatus and process of the present invention as applied to the dehydration of sewage sludge, and including a three-stage, forward flow evaporator, and solids pressing and combustion equipment, and FIG. 2 represents a fragmentary portion of a flow diagram of the apparatus and process of the present invention substantially similar to the flow diagram of FIG. 1, but including additionally a showing of equipment connected to provide a thermal recompression cycle from the second stage back to the first stage.

Referring now to the drawings in detail, especially FIG. 1 thereof, sewage sludge enters grinder or comminutor 2 through line 1. According to samples taken at Hershey, Pennsylvania, this sludge may typically comprise 7.2 weight percent solids and fats, and 92.8 weight percent water. Of the 7.2% solids, 1% is fat and the other is non-fat solids. From comminutor 2 the sludge containing solid particles of only a limited maximum size of about ¼-inch flows into fluidizing tank 4 through line 3. About 50 parts of hot oil or fat are added through line 5 to tank 4 to maintain a pumpable fluid sludge or sewage solids system or mixture even after the evaporation of the water content therefrom. The system is mixed and agitated in fluidizing tank 4 by means of stirring device 6, and then withdrawn from the tank by means of pump 7.

The pump delivers the mixture of sewage sludge and oil or fat through line 8 to the top of first stage or first effect evaporator generally designated 9 which may be of the falling film type, for example, and which is supplied with steam through line 10 from boiler-furnace 11. This steam may have a temperature in the range 215° F. to 255° F. After the steam has been condensed to water, it leaves the first stage evaporator through line 12 to return to the boiler-furnace, being picked up and driven by boiler feed pump 13. Within first stage evaporator 9 about one-third of the total water content of the incoming mixture of sewage sludge and oil, a mixture which may be called a wet slurry of sewage solids in oil, is evaporated and leaves vapor chamber 14 of the evaporator through line 15, with the partially dehydrated slurry descending into the evaporator's lower or sump region 16. The temperature of the departing vapor may be in the range 185° F. to 230° F. while the temperature of the descending slurry may be in the range 190° F. to 240° F. Pressure within first stage evaporator 9 is close to atmospheric, being in the range slightly below to slightly above atmospheric pressure.

Flow of the wet slurry or mixture of sewage sludge and oil to the first stage evaporator is controlled directly by throttle valve 17 in line 8 on the discharge side of pump 7. The opening of this valve is controlled in turn by slurry level sensing device 18 in the evaporator sump 16, this device sensing the level of the surface of the partially dehydrated slurry or mixture of sewage solids, some water, and oil therein. An excessively high level causes the valve to close at least part way with consequent reduction in flow of wet slurry to the first stage evaporator, while an excessively low level causes the valve to open wider with consequent increase in flow.

Partially dehydrated slurry is withdrawn continuously from first stage evaporator sump 16 through line 19 by means of pump 20, and is discharged thereby to the top of second stage or second effect evaporator generally designated 21 which is supplied with steam or hot water vapor through line 15 from the vapor chamber of first stage evaporator 9. After the steam has been condensed to water, it leaves the second stage evaporator through line 22, being picked up by pump 23 and driven out finally through line 24 along with other condensate or return streams for reuse through the sewage treatment plant.

Within second stage evaporator 21 about one-half of the water content of the incoming partially dehydrated mixture of sewage sludge and oil is evaporated, and leaves vapor chamber 25 of the evaporator through line 26, with the further dehydrated slurry descending into the evaporator's lower or sump region 27. The temperature of the departing vapor may be in the range 160° F. to 205° F. while the temperature of the descending slurry may be in the range 170° F. to 215° F. Pressure within second stage evaporator 21 is lower than that in first stage evaporator 9, being generally appreciably below atmospheric pressure.

Flow of the partially dehydrated slurry or mixture of sewage sludge and oil to the second stage evaporator is controlled directly by throttle valve 28 in line 19 on the discharge side of pump 20. The opening of this valve is controlled in turn by slurry level sensing device 29 in the evaporator sump 27, this device sensing the level of the surface of the further dehydrated slurry or mixture of sewage solids, at least some water, and oil therein. An excessively high level causes the valve to close at least part way with consequent reduction of flow of partially dehydrated slurry to the second stage evaporator, while an excessively low level causes the valve to open wider with consequent increase in flow.

Further dehydrated slurry is withdrawn continuously from second stage evaporator sump 27 through line 30 by means of pump 31, and is discharged thereby to the top of third stage or third effect evaporator generally designated 32 which is supplied with steam or hot water vapor through line 26 from the vapor chamber of second stage evaporator 21. After this steam has been condensed to water, it leaves the third stage evaporator through line 33, being picked up by pump 34 and driven out finally through line 24 along with other condensate or return streams for reuse through the sewage treatment plant.

Within third stage evaporator 32 substantially all of the remaining water content of the incoming further dehydrated mixture of sewage sludge and oil is evaporated at a pressure which may be in the range 4 in. Hg abs. to 12 in. Hg abs. It leaves vapor chamber 35 of the evaporator through line 36, and flows into barometric condenser 37 within which a sub-atmospheric pressure of about 2 in. Hg abs. to 8 in. Hg abs. is maintained by means of ejector 38 supplied with steam through line 39. Essentially fully dehydrated slurry or a mixture of almost only sewage solids and oil having a temperature in the range 140° F. to 185° F. descends in the third stage evaporator's lower or sump region 40.

Vapor entering condenser 37 through line 36 is mixed with and condensed by cooling water entering the condenser through line 41, and the resulting stream of rather warm water is discharged through line 42 into hot well 43. The hot well also receives the steam and non-condensable gases leaving ejector 38 through line 44, and the water in the well serves to condense this steam with the non-condensables escaping at and from the water surface. From the hot well itself water flows out continuously through line 45 connecting into line 24, and through the latter line is finally discharged along with other condensate or return streams for reuse through the sewage treatment plant. In an alternate arrangement, the steam and non-condensables leaving ejector 38 could be sent to fuel oil nozzles or firing apparatus of boiler-furnace 11 and used to atomize liquid fuel if the same were used. The non-condensables, being odoriferous and being at least partly of a flammable nature, would themselves provide heating value as they participated in the furnace combustion.

Flow of the further dehydrated slurry or mixture of sewage sludge and oil to the third stage evaporator is controlled directly by throttle valve 46 in line 30 on the discharge side of pump 31. The opening of this valve is controlled in turn by slurry level sensing device 47 in the evaporator sump 40, this device sensing the level of the surface of the essentially fully dehydrated slurry or mixture of sewage solids and oil therein. An excessively high level causes the valve to close at least part way with consequent reduction of flow of further dehydrated slurry to the third stage evaporator, while an excessively low level causes the valve to open wider with consequent increase in flow.

Dry slurry is withdrawn continuously from third stage evaporator sump 40 through line 48 by means of pump 49, and is discharged thereby to centrifuge 50. Flow of the dry slurry or mixture of sewage solids, oil, and trace quantities of water to the centrifuge is controlled directly by throttle valve 51 in line 48 on the discharge side of pump 49. The opening of this valve is controlled in turn by moisture sensing device 52 in the sump of the evaporator. At least an excessively high moisture content of the slurry in the evaporator sump causes this valve to close part way with consequent reduction in flow of dry or dehydrated slurry from the evaporator. Normal composition of dry slurry leaving the evaporator through line 48 would be about 1% water, approximately 15% non-fat solids, and the remainder liquid fat or oil.

Centrifuge 50 separates the dehydrated sewage sludge and oil slurry into two streams. One of these streams, a stream of relatively clear oil, is discharged and delivered through line 53 to centrifuge oil tank 54. This oil is recycled or circulated back from tank 54 to fluidizing tank 4 through line 5 by means of pump 55. Should the system generate oil in excess of that needed for fluidizing purposes, this excess or net product oil may be withdrawn from tank 54 through line 56 provided with stop valve 57. The other stream from the centrifuge, a stream containing substantially all of the sewage solids but which is still about 30% to 40% oil by weight, is discharged and delivered through line 58 to a mechanical pressing apparatus 59 of a kind constructed and configured to effect substantial separation of the liquid and solid components of a liquids-solids mixture.

In the drawing, pressing apparatus 59 is suggestively in the nature of a reciprocating press or liquid-solid separator, for example, a piston-type, perforated barrel or curb or cage press such as that disclosed in United States Patent No. 1,135,309 issued to E. T. Meakin on Apr. 13, 1915. It may indeed be a press of this nature but it may also be a press of any other suitable kind. In the general sense, of course, centrifuge 50 itself may be regarded as a liquid-solid separating press, one in which pressures or separating forces are generated dynamically rather than statically. It is within the contemplation of the present invention that certain waste solids concentrates amenable to processing in accordance with it will yield dry slurries at the third or final stage evaporator sump discharge which can be separated economically and adequately into their non-fat solids and liquid oil components by means of a single piece of mechanical equipment only, that is, for example, by either a centrifuge alone or a perforated barrel press alone.

Two streams of material leave press 59, possibly intermittently depending upon the nature of the press. One of these, a stream of oil withdrawn from the press through line 60 by means of pump 61, represents the oil pressed out of the stream of essentially water-free but still oil-containing material delivered to the press through line 58 from centrifuge 50. As shown, line 60 and line 48 connect at a T-joint to form a single line so that oil flowing through line 60 mixes with and further fluidizes the dry slurry of sewage solids and oil from the third stage evaporator to the centrifuge. This is not the only way in which oil from the press can be handled. Such oil may, for instance, be sent directly to centrifuge oil tank 54 for prompt recycling to fluidizing tank 4.

Assuming that the sewage sludge is originally oil-containing, the vigor of the operation performed in and by press 59 will determine whether or not the system generates a net oil product which can be withdrawn through line 56 or otherwise. Pressing down to just a "break even" level of residual oil in the sewage solids will allow the system to function without the addition of any oil or fat except the quantity needed for start-up purposes, but also without the possibility of generating any net oil product. Pressing to a level higher than the "break even" level, that is, a level at which there is more residual oil in the pressed sewage solids than there was oil originally associated with these solids in the sewage sludge flowing into the system through line 1, will not only eliminate the possibility of a net oil product, but also require that the system be supplied continuously with oil or fat for make-up purposes.

The other stream of material leaving press 59, a stream of pressed, dry sewage solids withdrawn from the press through or along line or conveyor track 62 is delivered to grinder or comminutor 63. These solids, in cake or chunk form upon ejection from press 59, will contain some oil or fat, but desirably no more than about 20% by weight, and most desirably fat in an amount less than 15% by weight. By means of grinder 63 the pressed solids are reduced to granular if not powder form, and from the grinder they flow through line 64 to a rotary selector valve 65 by which they may be directed to either line 66 or line 67. Line 66 leads to collecting or bagging equipment, and through it the solids may be withdrawn for later use as fertilizer or other employment outside the illustrated system. Line 67, shown as active according to the setting of valve 65, leads to the suction of a blower 68, and this blower discharges the comminuted sewage solids or fuel to the combustion region of boiler-furnace 11 through line 69.

When the process of this invention is used for the treatment of sewage sludge it is expected, as noted earlier, that it will be able to generate combustible solids at a rate sufficient to meet all fuel requirements for stream generation. On the other hand, when the sewage solids are drawn off as a process product through line 66 the fuel for firing the boiler-furnace must be provided from another source. This provision is indicated by oil line 70 leading to boiler-furnace 11. Of course suitable substitute or supplemental fuels other than oil may be used as convenient or as indicated by supply conditions and costs. To the extent that the sewage solids are burned as fuel, some residual ash or non-combustible mineral matter will remain after these solids have been fired. This ash may be recovered by means of proper cyclones and dust collectors, and its removal from the boiler-furnace is indicated by line 71. Being rich in minerals, this ash may itself be quite valuable as a fertilizer. This is true because although furnace combustion temperatures are in the range about 1,600° F. to 1,800° F. which insures organic material or odor destruction, the exit stack gas temperatures are below 450° F. on account of the high efficiency of heat transfer from the furnace gases to and through the boiler steaming surfaces. The low exit temperatures result in entry into the atmosphere of only a minimum of volatile ash constituents such as the valuable phosphorus pentoxide component.

Referring next to FIG. 2, the first stage 109 of a triple effect evaporator used in the process of the present invention including the step or cycle of thermal recompression is fed at the top with wet slurry or a mixture of sewage solids, water, and oil through line 108. The partially dehydrated slurry descends through first stage vapor chamber 114 toward the sump of this stage, not shown. Condensate from the first stage leaves through line 112 to return in part to the boiler-furnace, also not shown. The weight rate of flow of condensate in line 112 exceeds that of boiler steam supplied to the evaporator system as is explained in greater detail hereinafter. Condensate in line 112 in excess of that needed for boiler feed water is available along with other condensate or return streams for reuse through the sewage treatment plant. Hot vapor or steam from the first stage vapor chamber flows to second stage 121 through line 115. The partially dehydrated slurry from the sump of the first stage evaporator is fed into the top of the second stage through line 119, and descends through second stage vapor chamber 125 toward the sump of this stage, not shown. Condensate from the second stage leaves through line 122 on its way to join other condensate or return streams for use through the sewage treatment plant. Hot vapor or steam from the second stage vapor chamber flows to the third stage, not shown, through line 126.

Boiler steam is supplied to the evaporator or evaporator system through line 110, and flows first of all to a venturi tube or converging-diverging nozzle 172. It leaves this nozzle through line 174 which connects into the steam side of the heating or evaporating portion of first stage evaporator 109. A line 173 extends from the steam side of the heating portion of second stage 121 to the throat or low pressure section of venturi tube 172. The venturi is so designed with respect to the evaporator equipment that, with normal conditions of steam pressure, temperature, and flow rate through line 110, and a normal flow of wet slurry into the system through line 108, the pressure in the venturi throat is lower than the pressure in the steam side of the heating portion of second stage evaporator 121. In this circumstance, steam flows through line 173 from steam side of the heating portion of the second stage into the venturi tube where it mixes with and, in the discharge or expansion portion of the venturi, is raised in pressure or compressed by the driving steam flowing to the venturi through line 110. So far as the steam withdrawn from second stage evaporator 121 is concerned, it is thus subjected to a process step called thermal recompression, and venturi tube or converging-diverging nozzle 172 may be designated a thermo-compressor. The mixed stream of boiler or driving steam and steam withdrawn from the second stage through line 173 serves as the source of heat for first stage evaporator 109 which it enters through line 174. The weight of condensate leaving the first stage through line 112 per unit time will exceed the weight of steam flowing through line 110 by the weight of steam or vapor added through line 173.

The ratio by weight of the steam withdrawn from second stage evaporator 121 to enter venturi 172 through line 173 to the boiler steam flowing to the venturi through line 110 may be about 2:1 or higher. In any event, due consideration being paid to the efficiency of the venturi as a compressor, the ratio is adjusted to give a temperature of the steam mixture flowing through line 174 to the heating side of evaporating portion of first effect evaporator 109 which is not far above, possibly only about 10° F. above, the desired evaporation temperature of wet slurry entering this stage through line 108. The small temperature difference for heat transfer purposes between the heating material and the material being heated and evaporated in the first stage makes this stage one having a high thermal efficiency in keeping with established principles of thermodynamics. Maintenance of this small difference is possible because the boiling point of the quite dilute, wet slurry entering the first stage does not tend to rise significantly in boiling temperature in this stage even though large amounts of water are evaporated from it there, amounts twice or more as great as the associated amounts of boiler steam flowing through line 110.

When thermal recompression is used in a properly designed and operated system of the general kind illustrated in FIG. 2, a great deal more water is evaporated in the first stage than in any succeeding stage, perhaps twice as much or more. Since the driving temperature difference for heat transfer in the first stage is low as aforesaid, it follows that the first stage must have a great deal more heat transfer surface area than any later stage. This is indicated in a general way in FIG. 2 by the diameter of the heating or evaporating portion of first stage evaporator 109 being appreciably larger than that of that portion of second stage evaporator 121. Altogether, where it may be used properly, the advantages of thermal recompression are considerable. It has been pointed out hereinbefore, for example, that a multi-stage or multi-effect forward flow process for the dehydration of waste solids concentrates which employs thermal recompression may consume 25% to 35% less fuel than a multi-effect backward flow process used in the same service as described in co-pending application Ser. No. 311,792.

Protection by Letters Patent of this invention in all its aspects as the same are set forth in the appended claims is sought to the broadest extent that the prior art allows.

What is claimed is:

1. An apparatus for dehydrating initially water-containing waste solids concentrates, said apparatus comprising, (1) a tank adapted to receive a stream of such a waste solids concentrate and a stream of oil and wherein a mixing of these streams may be effected, (2) a multi-effect evaporator adapted to have fluid material to be heated and evaporated in it and vaporous material to effect this heating and evaporating flow through it cocurrently, and having a first outlet in its last evaporating region whereat material heated and dehydrated in this region but in a fluid state on account of a content of oil may be withdrawn from it, and a second outlet therein whereat water driven off as vapor from said mixture of waste solids concentrate and oil in said last evaporating region may be withdrawn therefrom, (3) a conduit extending from said tank to said multi-effect evaporator wherethrough a mixture of waste solids concentrate and oil may flow from said tank to the inlet of the first evaporating region of said evaporator, (4) pressing apparatus adapted to effect a separation of liquid-solid mixtures into their respective liquid and solid components, (5) a conduit extending from said first outlet in the last evaporating region of said multi-effect evaporator to said pressing apparatus wherethrough a substantially anhydrous mixture of waste solids and oil may flow from said evaporator to said pressing apparatus.

2. An apparatus for dehydrating initially water-containing waste solids concentrates according to claim 1 which further comprises condensing apparatus, and a conduit extending from said second outlet in the last evaporating region of said evaporator to said condensing apparatus wherethrough water driven off as vapor from said mixture of waste solids concentrate and oil in said last evaporating region may flow from said region to said condensing apparatus to be recondensed to water therein.

3. An apparatus for dehydrating initially water-containing waste solids concentrates according to claim 1 which further comprises a conduit extending from said pressing apparatus to said tank wherethrough separated liquid oil from said pressing apparatus may flow to said tank to be mixed therein with said stream of initially water-containing waste solids concentrate.

4. An apparatus for dehydrating initially water-containing waste solids concentrates according to claim 1 which further comprises combustion apparatus associated with said multi-effect evaporator for supplying evaporative heat thereto, and means for discharging separated waste solids from said pressing apparatus to said combustion apparatus, said combustion apparatus being adapted to receive said solids and burn the same as fuel to provide at least part of the evaporative heat required by said multi-effect evaporator.

5. An apparatus for dehydrating liquiform waste solids concentrates according to claim 4 in which said combustion apparatus associated with said multi-effect evaporator comprises a boiler-furnace for the generation of steam, and a conduit extending from said boiler-furnace to said evaporator wherethrough fresh heating steam may flow from the boiler-furnace to the evaporator.

6. An apparatus for dehydrating initially water-containing waste solids concentrates according to claim 1 which further comprises flow circuit means whereby vaporous material for heating of material to be heated and evaporated may be withdrawn from the second effect of said multi-effect evaporator by action of fresh vaporous heating material and compressed by and mixed with this fresh material to form a resultant stream of vaporous heating material, and this resultant stream conducted to the first effect of said evaporator.

7. An apparatus for dehydrating initially water-containing waste solids concentrates according to claim 6 in which said flow circuit means includes a venturi tube wherein and whereby vaporous heating material may be withdrawn from the second effect of said multi-effect evaporator through aspirating action of a stream of fresh vaporous heating material, and compressed by and mixed with this fresh material.

8. A process for dehydrating initially water-containing waste solids concentrates which comprises the steps of (1) admixing such a waste solids concentrate with a relatively non-volatile oil to obtain a mixture which will remain fluid and pumpable after the removal of the water content therefrom; (2) separately subjecting the resultant oil-containing mixture to a plurality of sequential dehydration steps by heat evaporation wherein each of the successive dehydration steps is at a successively lower temperature and the resulting oil-containing mixtures are of successively higher solids concentration because of increasing dehydration; (3) utilizing the vapors evolved from each heat evaporation step except the last one to supply a substantial portion of the heat requirements of the following heat evaporation step, and (4) withdrawing a resultant substantially anhydrous waste solids concentrate and oil slurry.

9. A process for dehydrating initially water-containing waste solids concentrates according to claim 8 in which said waste solids concentrate is sewage sludge.

10. A process for dehydrating initially water-containing waste solids concentrates according to claim 8 in which processing temperatures of the oil and waste solids concentrate mixture in the range about 100° F. to 400° F. are utilized in the dehydration steps.

11. A process for dehydrating initially water-containing waste solids concentrates according to claim 8 which further comprises the step of recovering the water content of said waste solids concentrate by gathering and condensing the vapors driven off from said mixture of waste solids concentrate and oil in the course of said evaporative dehydration steps.

12. A process for dehydrating initially water-containing waste solids concentrates according to claim 8 which further comprises the step of separating oil from the anhydrous waste solids concentrate and oil slurry to give a substantially oil-free waste solids product.

13. A process for dehydrating initially water-containing waste solids concentrates according to claim 12 including the additional step of recycling separated oil to the waste solids concentrate admixture step.

14. A process for dehydrating initially water-containing waste solids concentrates according to claim 12 including the additional step of utilizing recovered waste solids product as fuel for supplying heat for said dehydration steps by heat evaporation.

15. A process for dehydrating initially water-containing waste solids concentrates which comprises the steps of (1) admixing such a waste solids concentrate with a relatively non-volatile oil to obtain a mixture which will remain fluid and pumpable after the removal of the water content therefrom; (2) subjecting the resultant oil-containing mixture to a plurality of sequential dehydration steps by heat evaporation wherein each of the successive dehydration steps is at a successively lower temperature and the resulting oil-containing mixtures are of successively higher solids concentration because of increasing dehydration; (3) utilizing the vapors evolved from each heat evaporation step except the last one to supply a substantial portion of the heat requirements of the following heat evaporation step; (4) continuously withdrawing at least part of the vapor evolved in the first heat evaporation step after this part has been used to supply a portion of the heat requirement of the second heat evaporation step and before this part has been condensed; (5) continuously mixing this withdrawn vapor with and recompressing it by means of fresh steam supplied for dehydration purposes, and utilizing this mixture to supply a substantial portion of the heat requirement of the first heat evaporation step, and (6) withdrawing a resultant substantially anhydrous waste solids concentrate and oil slurry following the last heat evaporation step.

16. A process for dehydrating initially water-containing waste solids concentrates according to claim 15 in which said part of the vapor evolved in the first heat evaporation step is withdrawn by aspirating action of said fresh steam in a flow process, and is mixed with and recompressed by the fresh steam in the course of such process.

17. A process for dehydrating initially water-containing waste solids concentrates according to claim 16 in which the ratio by weight of the withdrawn vapor to the fresh steam is at least bout 2:1.

References Cited

UNITED STATES PATENTS

| 578,512 | 3/1897 | Hogel | 23—259.3 |
| 1,476,685 | 12/1923 | Bouillon | 210—71 |
| 2,151,079 | 3/1939 | Bowen | 210—2 |
| 2,769,489 | 11/1956 | Eckstrom | 159—24 |
| 2,888,449 | 5/1959 | Borck | 159—17 |

FOREIGN PATENTS

| 7,625 | 5/1963 | Japan. |

NORMAN YUDKOFF, *Primary Examiner.*

J. SOFER, *Assistant Examiner.*